United States Patent [19]
Lee

[11] 3,880,842
[45] Apr. 29, 1975

[54] CEPHALOSPORIN DERIVATIVES

[75] Inventor: Bong Kuk Lee, Old Bridge, N.J.

[73] Assignee: E. R. Squibb & Sons, Inc., Princeton, N.J.

[22] Filed: May 30, 1972

[21] Appl. No.: 258,015

[52] U.S. Cl............ 260/240 G; 424/246; 260/243 C
[51] Int. Cl............................................. C07d 99/24
[58] Field of Search..................... 260/242 C, 240 G

[56] References Cited
UNITED STATES PATENTS
3,222,362  12/1965  Flynn ............................ 260/243 C
3,708,479  1/1973   Welch ........................... 260/243 C Primary Examiner—Nicholas S. Rizzo
Attorney, Agent, or Firm—Lawrence S. Levinson; Merle J. Smith; Stephen B. Davis

[57] ABSTRACT

This invention relates to new cephalosporin derivatives and methods for preparing the same, said derivatives having the structure

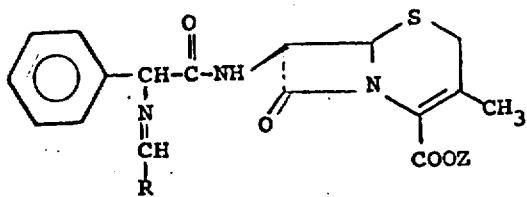

and

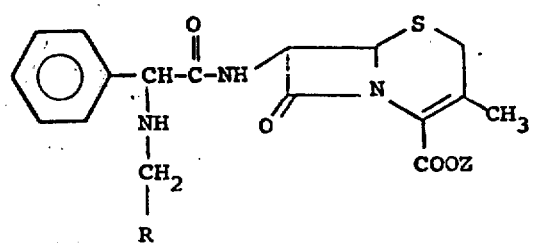

wherein Z is hydrogen, lower alkyl or a salt forming ion and R is aryl, substituted aryl, lower alkyl or cycloalkyl. These compounds are useful as antibacterial agents.

5 Claims, No Drawings

CEPHALOSPORIN DERIVATIVES

This invention relates to new cephalosporin derivatives of the formula

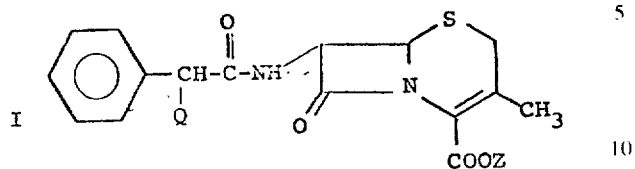

wherein Z is hydrogen, lower alkyl or a salt forming ion e.g., an alkali metal as sodium or potassium, an alkaline earth metal like calcium or magnesium, or that of an organic base like dibenzylamine, N,N-dibenzylethylenediamine or the like, and Q is —N=CH—R or —NH—CH$_2$—R wherein R is aryl, substituted aryl, lower alkyl or cycoalkyl.

Thus, the cephalosporin derivatives of the invention include the following sub-genuses:

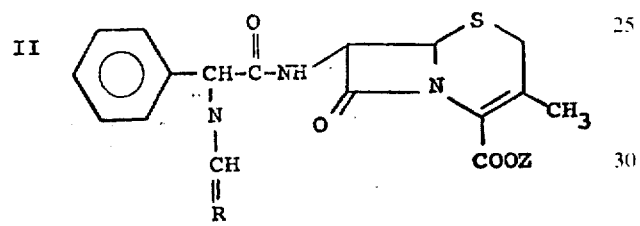

and

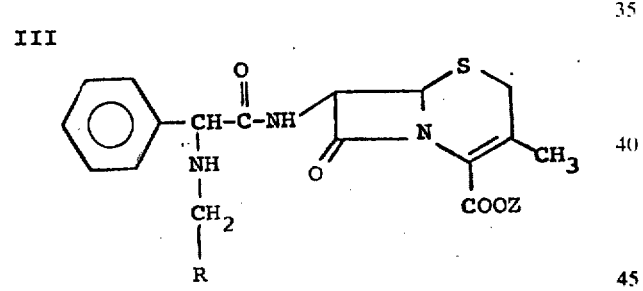

The lower alkyl groups represented by the above R groups include straight or branched chain aliphatic hydrocarbon radicals having up to seven carbon atoms, such as methyl, ethyl, propyl, isopropyl, butyl, isobutyl, t-butyl, amyl, hexyl, heptyl, and the like. The lower alkyl groups can include as substituents any of the aryl groups mentioned below as well as halogen (Cl, Br, I or F).

The term "aryl" includes monocyclic or bicyclic monovalent aromatic ring systems such as phenyl or naphthyl. These aryl radicals can include as substituents at the ortho-position halogen, hydroxy, alkanoic acid, lower alkoxy, amido or any of the alkyl groups mentioned hereinbefore.

For example, aryl radicals and substituted aryl radicals contemplated herein include, but are not limited to, the following:

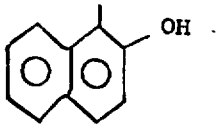

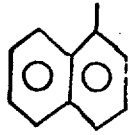 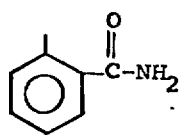

 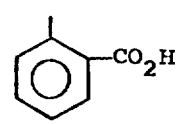

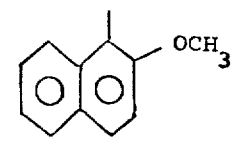 and

The term "cycloalkyl" includes monocyclic carbocyclic radicals having from 3 to about 6 carbons such as cyclopropyl, cyclobutyl, cyclopentyl and cyclohexyl.

The compounds of Formula II can be prepared by reacting a compound of the structure

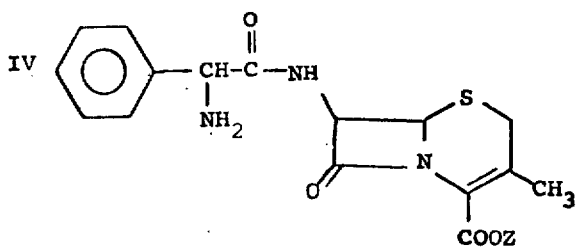

with an aldehyde of the structure,

V     $RCH=O$ to form compounds of the structure

VI 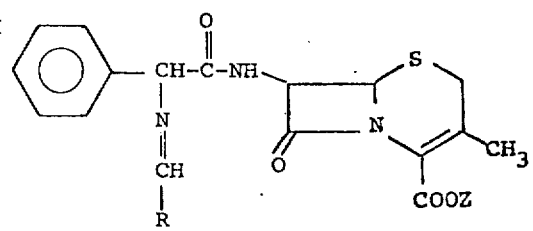

In carrying out the above reaction, the reaction of compound IV with the aldehyde V is preferably carried out in an aqueous media such as in a mixture of water with a lower alkanol such as methanol, ethanol or n-propanol, or ketones such as methylethyl ketone or methyl isobutyl ketone. The reaction may be carried at temperatures ranging from about 0° to about 40°C. Compound IV is employed in a ratio to Compound V within the range of from about 1:1 to about 1:3, preferably from about 1:1 to about 1:1.5 and optimally at about 1:1.1.

Compounds of formula II can also be prepared by reacting a compound of the formula VII 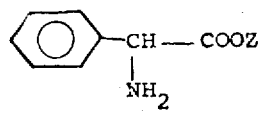

with an aldehyde of formula V to form a compound of the formula

VIII 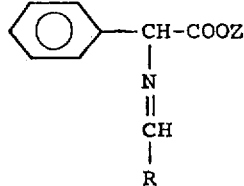

and thereafter reacting VIII with an acid halide compound of the structure

IX 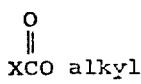

to form a mixed anhydride of the structure

X 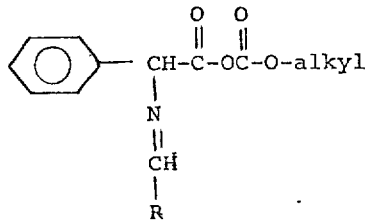

which is reacted with 7-ADCA (i.e. 7-amino desacetoxy cephalosporanic acid

XI

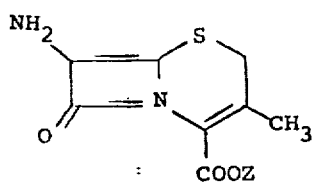

to form the formula II compounds.

The reaction of Compound VII with the aldehyde (V) is carried out in the presence of an aqueous-alcoholic solvent, such as a mixture of water and methanol, at temperatures ranging from ambient temperature to the boiling point of the solvent. Compound VII can be employed in a molar ratio to the aldehyde (V) within the range of from about 1:1 to about 1:3 and preferably from about 1:1 to about 1:1.5.

The reaction of compounds VIII and IX is carried out in a mixture of solvents such as acetone, dioxane and lutidine at temperatures ranging from about −10° to about 20°C and preferably from about −10° to about 10°C, employing a molar ratio of IX:VIII within the range of from about 1:1 to about 3:1 preferably 1.1:1 to 1.5:1.

The reaction of the mixed anhydride X with 7-ADCA is carried out in an aqueous solvent such as aqueous sodium bicarbonate at a temperature with the range of from about −15° to about 5°C and preferably from about −5° to about 0°C employing a molar ratio of X:XI within the range of from about 1:0.8 to about 2:1 and preferably from about 1.1:1 to about 1.5:1.

Compounds of formula VI can be reduced by reacting VI with a reducing agent such as sodium borohydride, aluminum borohydride, lithium aluminum hydride, or hydrogen in conjunction with a catalyst for reduction such as platinum or palldium to form compounds of the structure III 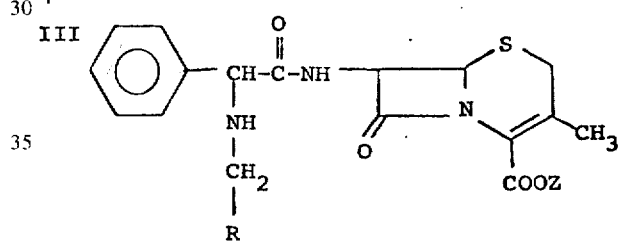

The above reduction can be carried out in water or aqueous solvents, such as aqueous potassium phosphate, at temperatures ranging from about 0° to about 40°C and preferably from about 10° to about 20°C employing a molar ratio of Compound II to reducing agent within the range from about 1:2 to about 1:10 and preferably from about 1:4 to about 1:6.

Alternatively, the formula III compounds can be prepared by forming compounds of formula VIII above, reducing the formula VIII compound by reacting it with any of the aforementioned reducing agents to form a compound of the formula XII 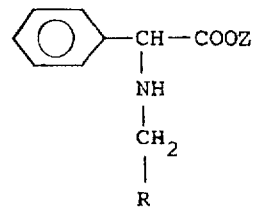

and thereafter reacting XII with an acid halide of structure IX to form the mixed anhydide of formula XIII.

XIII 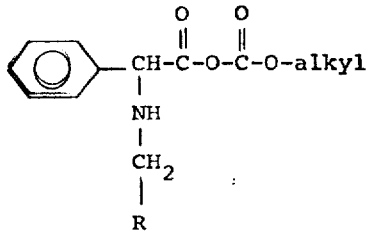

which can be reacted with 7-ADCA (formula XI) to form the formula III compounds.

It will be appreciated that essentially the same reaction conditions as set out with respect to the reaction of Compounds VIII, IX, X and XI, apply here as well.

The starting materials of structure IV are prepared by coupling a compound of the structure

XIV

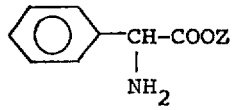

with a 7-ADCA moiety, that is with

XI

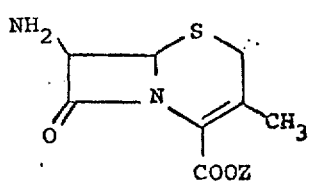

according to known techniques.

Examples of aldehydes which can be employed herein as starting materials include, but are not limited to, the following

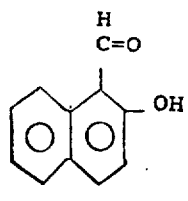

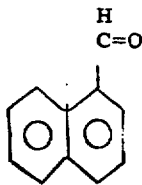

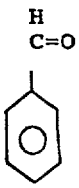

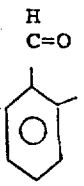

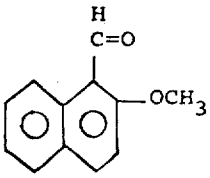

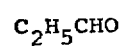

$C_4H_9CHO$

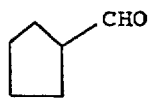

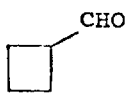

and

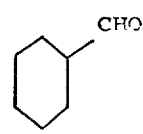

The products of this invention form salts which are also part of the invention. Basic salts form with the acid moiety as discussed above in connection with the symbol Z. Acid addition salts also form with the α-amino nitrogen. Such acid salts include, for example, inorganic salts such as the hydrohalides, e.g., hydrobromide, hydrochloride, hydroiodide, sulfate, nitrate, phosphate, borate, etc., and organic salts such as acetate, oxalate, tartrate, malate, citrate, succinate, benzoate, ascorbate, methanesulfonate and the like. It is frequently convenient to isolate and purify the product by forming a soluble or insoluble salt, as desired, then regenerating the free compound, by neutralization, for example.

The compounds of this invention have a broad spectrum of antibacterial activity against both gram positive and gram negative organisms such as *Staphylococcus aureus*, *Salmonella schottmuelleri*, *Pseudomonas aeruginosa*, *Proteus vulgaris*, *Escherichia coli* and *Streptococcus pyogenes*. They may be used as antibacterial agents in a prophylactic manner, e.g., in cleaning or disinfecting compositions, or otherwise to combat infections due to organisms such as those named above, and in general may be utilized in a manner similar to penicillin G and other penicillins and cephalosporins. For example, a compound of Formula I or a physiologically acceptable salt thereof may be used in various animal species in an amount of about 0.1 to 100 mg./kg. daily, orally or parenterally, in single or two to four divided doses to treat infections of bacterial origin. By way of illustration the $PD_{50}$ orally in mice in a single administration is 1.3 mg./kg. against Streptococcus, 8.6 mg./kg. against Proteus and 11.8 mg./kg. against Salmonella, respectively. Up to about 600 mg. of a compound of Formula I or a salt thereof may be incorporated in an oral dosage form such as tablets, capsules or elixirs or in an injectable form in a sterile aqueous vehicle prepared according to conventional pharmaceutical practice. In cleaning or disinfecting compositions, e.g., in barns or dairy equipment, a concentration of about 0.01 to 1% by weight of such compounds admixed with, suspended or dissolved in conventional inert dry or aqueous carriers for application by washing or spraying may be used.

The following examples are illustrative of the invention. All temperatures are on the Centigrade scale.

EXAMPLE 1

7-[2-phenyl-2-[[(2-hydroxy-1-naphthyl)methylene]amino]acetamido]-3-methyl-8-oxo-5-thia-1-azabicyclo[4.2.0]oct-2-ene-2-carboxylic acid, sodium salt, hydrate

A. Na salt of α-aminobenzyl-3-desacetoxy cephalosporin

The sodium salt of α-aminobenzyl-3-desacetoxy cephalosporin is formed by dissolving 1,394 mg (4 millimoles) of α-aminobenzyl-3-desacetoxy cephalosporin and 336 mg (4 millimoles) of $NaHCO_3$ in a mixture of 30 ml $H_2O$ and 350 ml methanol.

B.

7-[2-phenyl-2-[[(2-hydroxy-1-naphthyl)methylene]amino]-acetamido]-3-methyl-8-oxo-5-thia-1-azabicyclo[4.2.0]oct-2-ene-2-carboxylic acid, sodium salt, hydrate 712.4 mg (4.2 millimoles) of 2-hydroxy-1-naphthaldehyde is added to the sodium salt solution prepared in A, and the reaction mixture is stirred for 18 hours at about 10°C. Methanol is removed at less than 10°C in vacuo, and the remaining aqueous solution lyophilized to yield the title compound.

EXAMPLE 2

7-[2-phenyl-2-[[(2-hydroxy-1-naphthyl)methyl]amino]acetamido]-3-methyl-8-oxo-5-thia-1-azabicyclo[4.2.0]oct-2-ene-2-carboxylic acid, sodium salt, hydrate 1,017 mg (1.84 millimoles) of the product of Example 1 is dissolved in 400 ml of potassium phosphate buffer (0.5 M, pH 6), and to this solution is added 325 mg (8.55 millimoles) of $NaBH_4$ dissolved in 15 ml $H_2O$, dropwise, for 3 hours, with stirring, at a temperature of about 10°C. The reaction mixture is acidified to pH 3 in an ice bath, and centrifuged to separate a solid product. After washing the solid twice with 5 ml portions of cold water, it is dried in vacuo. The resulting solid and excess $NaHCO_3$ are dissolved in a mixture of 10 ml $H_2O$ and 30 ml methanol. The methanol is removed in vacuo at a temperature below 10°C to yield the title compound.

EXAMPLE 3

7-[2-phenyl-2-[[(2-hydroxy-1-naphthyl)methylene]amino]-acetamido]-3-methyl-8-oxo-5-thia-1-azabicyclo[4.2.0] oct-2-ene-2-carboxylic acid, sodium salt, hydrate A suspension of the sodium salt of D-2-amino-2-phenylacetic acid 1.75 g (10 millimoles) and 2-hydroxy-1-naphthaldehyde 3.44 g (20 millimoles) in a mixture of ethanol (250 ml) and methanol (20 ml) is refluxed for 2 hours. The mixture is then evaporated under reduced pressure and the residue is washed with ether and recrystallized from ethanol to give the sodium salt of phenyl-[[(2-hydroxy-1-naphthyl)-methylene]amino]acetic acid.

2.63 g (8 millimoles) of the N-protected amino acid is dissolved in a mixture of dry acetone (100 ml), dioxane (25 ml) and 2,6-lutidine (1.35 ml). The solution is rapidly chilled to −5°, treated with ethyl chlorocarbonate 0.955 mg (0.84 ml, 8.8 millimoles) and stirred at 0° for 10 minutes, during which lutidine hydrochloride is precipitated and the mixed anhydride formed in solution. The suspension is then cooled to −45° and stirred vigorously while an ice-cold solution of 7-ADCA 1.31 g (6.1 millimoles) in 3% aqueous sodium bicarbonate (28 ml) is added as rapidly as possible, the temperature of the mixture never being allowed to rise above 0°. The resulting solution is stirred for 30 minutes at 0° and then for a further 30 minutes without external cooling. It is then extracted with ether (3 × 150 ml), only the aqueous phase being retained. The latter is brought to pH 2 by addition of dilute hydrochloric acid and rapidly extracted with ether (100 ml in 3 portions). These second ether extracts, containing the N-protected cephalosporin, are washed with water (10 ml) and then extracted with sufficient 3% sodium bicarbonate to give a neutral aqueous phase, which is separated and evaporated at low temperature and pressure. The residue is shown, by paper chromatography of a small portion, to contain the sodium salt of the cephalosporin of the above title.

EXAMPLES 4 TO 12

The procedure described in Example 1 is repeated with the exception that the aldehyde set out below in Table 1, column A, are employed to thereby form the products set out in column B of Table 1.

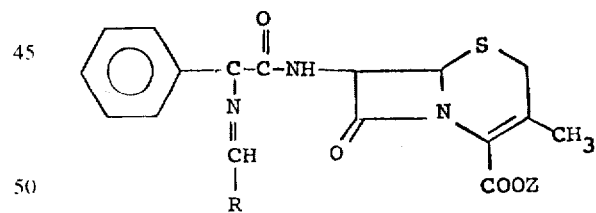

Table I

| Example No. | Column A<br>Aldehyde (R-CHO) | Column B<br>Product R |
|---|---|---|
| 4 | CHO-naphthyl | as in column A |
| 5 | CHO-phenyl | • |

Table I (Continued)

| Example No. | Column A  Aldehyde (R-CHO) R | Column B  Product R |
|---|---|---|
| 6 | 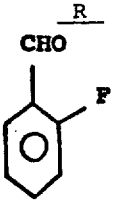 (2-fluorophenyl-CHO) | as in column A |
| 7 |  (naphthyl-CHO) | " |
| 8 | 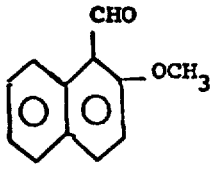 (methoxy-naphthyl-CHO) | " |
| 9 | C₃H₇CHO | " |
| 10 | C₅H₁₁CHO | " |
| 11 |  (cyclopropyl-CHO) | " |
| 12 | 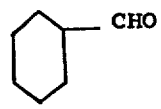 (cyclohexyl-CHO) | " |

EXAMPLES 13 TO 21

Employing the procedure described in Example 2, but substituting as the starting material, the products of Examples 4 to 12, the products set out in Table II below are obtained.

Table II

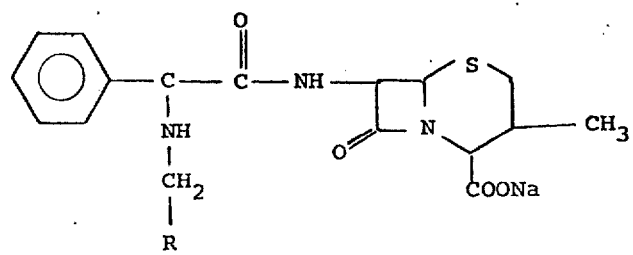

Table II (Continued)
| Example No. | R |
|---|---|
| 13 | 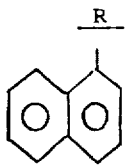 |
| 14 |  |
| 15 | 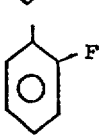 |
| 16 |  |
| 17 | 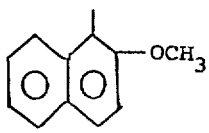 |
| 18 | $-C_3H_7$ |
| 19 | $-C_5H_{11}$ |
| 20 |  |
| 21 |  |
EXAMPLES 22 TO 30
Employing the procedure of Example 3, but substituting the starting material set out in column A of Table III below, the product shown in column B thereof is obtained.
Table III
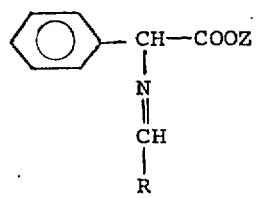
Starting Material
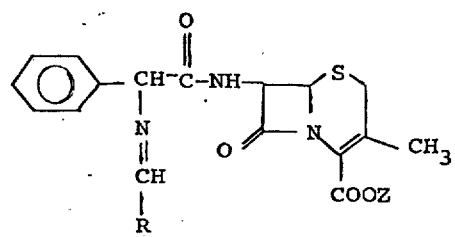
Product
| Example No. | R | Z | R | Z |
|---|---|---|---|---|
| 22 | 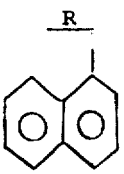 | K | as per | column A |
| 23 |  | H | " | " |

Table III — Continued

| Example No. | R | Z | R | Z |
|---|---|---|---|---|
| 24 | 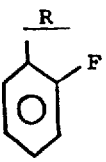 | CH$_3$ | " | " |
| 25 | 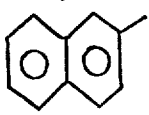 | Na | " | " |
| 26 | 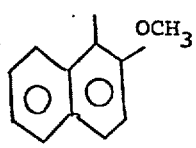 | H | " | " |
| 27 | –C$_3$H$_7$ | C$_2$H$_5$ | " | " |
| 28 | –C$_5$H$_{11}$ | Na | " | " |
| 29 |  | K | " | " |
| 30 |  | Na | " | " |

I claim:
1. A compound of the formula:

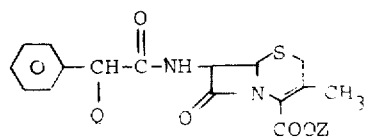

wherein Q is —N=CH—R or —NH—CH$_2$R and R is naphthyl or orthosubstituted naphthyl wherein said substituent is halogen, hydroxy, carboxyl, amido, lower alkoxy, or lower alkyl; and Z is hydrogen, lower alkyl, alkali metal, alkaline earth metal, dibenzylamine, or N,N-dibenzylethylenediamine; and acid-addition salts thereof.

2. A compound in accordance with claim 1 of the formula

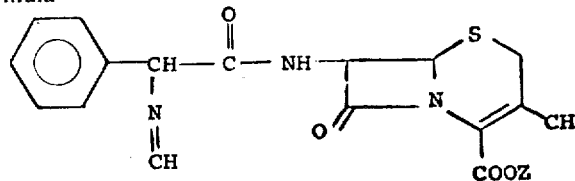

3. A compound in accordance with claim 2 wherein Z is Na.

4. A compound in accordance with claim 1 of the formula

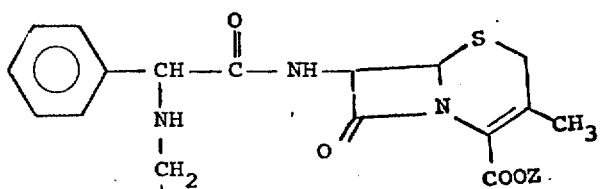

5. A compound in accordance with claim 4 wherein Z is Na.

* * * * *